2,964,482

ALKYD RESINS FROM CYCLODIENES

Robert F. Leary, Cranford, and Lewis W. Bowman, Westfield, N.J., assignors to Esso Research and Engineering Company, a corporation of Delaware No Drawing. Filed Jan. 30, 1956, Ser. No. 561,988

13 Claims. (Cl. 260—22)

This invention relates to improved polyesters and alkyd type resins which comprise reaction products of polyfunctional lactones derived from adducts of bicycloalkene dicarboxylic acids and dienophilic dicarboxylic compounds, preferably $C_3$ to $C_8$ unsaturated aliphatic dicarboxylic anhydrides, such as, fumaric, citraconic, mesaconic, itaconic, acticonic or, preferably maleic anhydride in combination with an unsaturated monobasic acid and certain glycols.

The invention relates more particularly to improved polyesters and alkyd type resins which have been derived from the reaction between (a) a dibasic acid lactone derived from an adduct of a dicyclodiene dicarboxylic acid such as a $C_{12}$ to $C_{18}$, preferably a $C_{12}$ to $C_{14}$ dicycloalkadiene dicarboxylic acid and maleic anhydride, with (b) glycols having two adjacent hydroxyl groups and/or with glycol ethers.

In a more specific aspect, the present invention contemplates a resinous polyester formed by the reaction of a dibasic acid lactone derived from a tricarboxylic anhydride, with certain glycols and a minor proportion of an unsaturated aliphatic monobasic acid wherein the tricarboxylic adduct formed has been produced by reacting a dicyclopentadiene dicarboxylic acid with maleic anhydride at temperatures between about 125° to 350° C., advantageously about 130° to 300° C., preferably about 135° to 250° C. The above tricarboxylic adduct is then refluxed with water to form a dibasic acid lactone thereof. This lactone, together with a minor proportion of a modifier, such as an unsaturated monobasic acid, is then esterified with a glycol of about 3 to 16 carbon atoms which is advantageously a glycol of about 3 to 8 carbon atoms containing two adjacent hydroxyl groups, or an ether-type glycol having at least 4 carbon atoms (preferably 4-12 carbon atoms). Suitable glycols include propylene glycol, 2,3-butanediol, diethylene glycol, triethylene glycol, etc. Esterification temperatures vary between about 50° to 350° C., advantageously about 100° to 300° C., preferably about 150° to 250° C., e.g. 180° to 240° C.

The modifier in the esterification reaction advantageously comprises about 15 to 60 equivalent percent, preferably 25 to 50 equivalent percent, based on the total equivalents of acid of an unsaturated aliphatic monobasic acid having about 10 to 20, preferably about 12 to 18 carbon atoms. Preferred monobasic acids are vegetable oil fatty acids, such as dehydrated castor fatty acid, oleic acid, ricinoleic acid, linoleic acid, linolenic acid, or especially linseed fatty acids and soybean fatty acids, etc. Reaction times vary from 1 to 40 hours or more, preferably about 15 to 20 hours.

On an equivalent basis, the amount of the dibasic acid lactone derivative of the tricarboxylic anhydride, plus the monobasic acid, should not exceed and preferably should be approximately equal to the amount (also in equivalents) of glycol in the resin to form a substantially completely esterified material.

In accordance with the present invention, the above alkyd type resin reaction products may be compounded with a resin solvent, such as naphthenic, aliphatic (e.g. paraffinic) or, preferably aromatic solvents, such as benzene, xylenes, toluene, or straight run mineral spirits, to produce a varnish. The varnish contains about 10 to 90, preferably about 25 to 75 parts by weight of the resin and correspondingly about 90 to 10, preferably 75 to 25 parts of solvent. To the varnish may then be added about 0.001 to 0.5, preferably about 0.1 to 0.5 part by weight of a drier such as metal carboxylate soaps including zinc, iron or calcium, naphthenates or octoates, or especially cobalt, lead or manganese naphthenates. It is, however, a specific feature of the present invention that no drier is required in order to produce, by heat treatment, improved films, particularly as to water, soap, grease and caustic resistance. Preferred heat treatments (baking temperatures) are between about 250° and 350° F., preferably about 275° to 325° F.

Dicyclodiene dicarboxylic acids which are derived primarily from $C_{10}$ to $C_{16}$ dicycloalkadienes, such as alkyl-substituted dicyclopentadienes or especially dicyclopentadiene per se, may be prepared in high yields by the reaction of the particular cyclodiene, such as cylopentadiene with metallic sodium followed by carboxylation with $CO_2$. In this two-step reaction, the sodium is preferably dispersed to an average particle size of less than about 50 microns in diameter and reacted with cyclopentadiene or alkyl cyclopentadienes in the presence of a small amount of an anhydrous alcohol activator, such as ethyl or isopropyl alcohol, followed by conversion of the sodium cyclopentadienes formed to corresponding acid salts by treatment with $CO_2$, preferably at superatmospheric pressures up to 1000 p.s.i.g.

When 1 to 2 grams of anhydrous alcohol activator, per mole of dispersed sodium, are employed, the disodium salt of the dicyclopentadiene dicarboxylic acid is produced with minimum production of sodium carbonate or dicarbonate.

The free dicyclopentadiene dicarboxylic acid is then prepared by hydrolyzing the sodium salt with an aqueous solution of a mineral acid, such as HCl, $H_2SO_4$, $HNO_3$, etc. Sulfuric acid or hydrochloric acid is preferred. The sodium salt is conveniently converted to the free acid by dissolving the salt in water, boiling for a few minutes and precipitating the acid by addition of dilute HCl and recovering the acid crystals by filtration. The crude product is recrystallized from approximately 50% aqueous methanol or approximately 70% aqueous acetic acid. A perfectly white crystalline acid is obtained having a melting point of 210° C. and a neutralization equivalent equal to 509 mgm. KOH/gm. It may be represented by the following structural formula

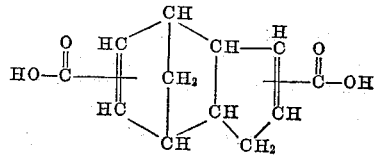

The reactions above described are believed to be according to a series of equations which may be illustrated as follows:

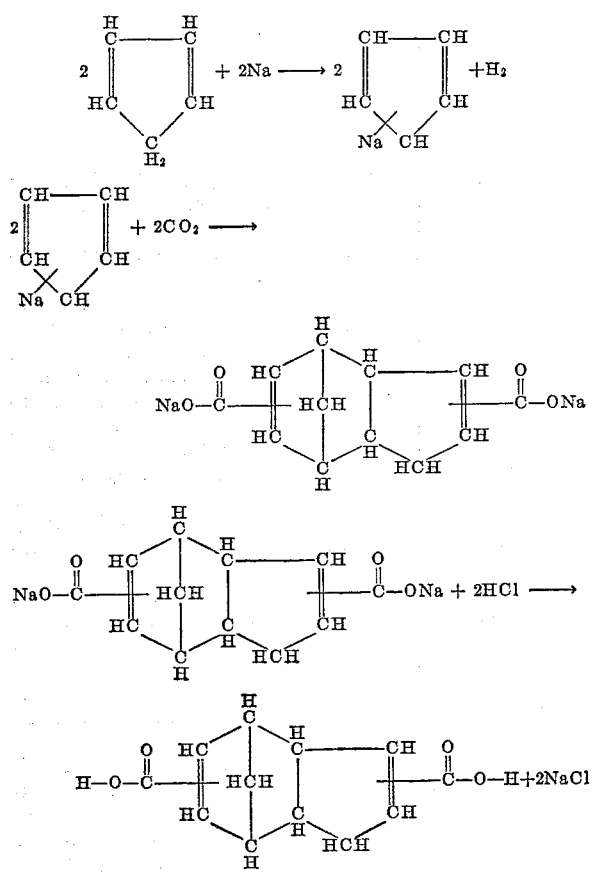

The above ultimate compound produced in the last equation is dicyclopentadiene dicarboxylic acid and is subsequently reacted with suitable dienophilic acid compounds such as maleic anhydride to form a tricarboxylic adduct as more fully described hereinafter. The basic principle of the reaction is that a small amount of the dimer acid is decomposed to monomer when heated, although the equilibrium of the mixture heavily favors the dibasic acid dimer. The monomer acid present will form stable tribasic acid derivatives by combining with added dienophilic compounds such as maleic anhydride, displacing the equilibrium until virtually all of the original dimer acid is reacted.

Other dicarboxylated dicyclodiene compounds suitable for the purposes of the present invention, but less preferable, are monomethyl or dimethyl dicyclopentadiene dicarboxylic acid, i.e., the dicarboxylated dimer of methylcyclopentadiene, or methyl dicyclopentadiene dicarboxylic acid, i.e., the mixed dimer of cyclopentadiene carboxylic acid and methyl cyclopentadiene carboxylic acid.

The other essential reagent used in the present invention is a dienophilic unsaturated dicarboxylic compound, such as maleic acid and preferably maleic anhydride.

The desired reaction to form the tricarboxylic adduct is carried out satisfactorily by heating the reaction mixture at temperatures sufficiently high to bring about cracking or depolymerization of the dicyclodiene dicarboxylic acid into its monomer. These reaction temperatures, as beforementioned, are in the range of about 125° to 350° C., advantageously about 130° to 300° C., the preferred reaction temperatures being between about 135° C. and 200° or 250° C. The pressure depends to a certain extent on the particular cyclodiene dicarboxylic acid employed, the dienophilic anhydride or acid used and the temperature at which the reaction is carried out. However, the reaction may be normally conducted at pressures ranging from atmospheric or slightly subatmospheric to moderately elevated pressures, such as 10 or 50 p.s.i.g., the reaction being a rapid one which can normally be completed in 5 to 60 minutes. The reaction can be carried out either batchwise or in a continuous manner.

The reaction may be represented by the following simultaneous steps as applied to illustrative reactants within the scope of the invention:

*Depolymerization step*

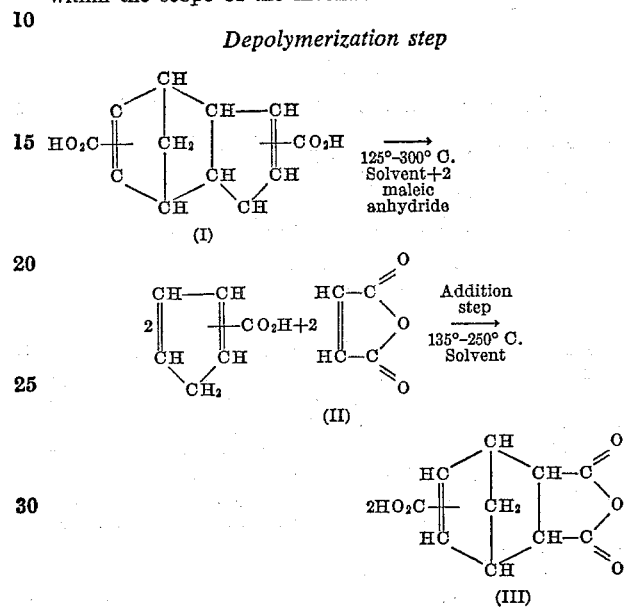

The resulting compound (III) is a derivative of bicycloheptene and is termed bicyclo (2,2,1)-5-heptene-2,3-dicarboxylic anhydride-5 or 6-carboxylic acid. It can also be designated as endo-methylene-4-cyclohexene-4 or 5-carboxy-1,2-dicarboxylic acid anhydride. This anhydride, as indicated above, is capable of existing in either the "endo" or "exo" form. The higher the reaction temperature between the cyclodiene dicarboxylic acid and maleic anhydride, the greater the amount of "endo" isomer.

In practicing the present invention, in order to produce larger quantities of the endo isomer, reaction temperatures are regulated between about 125° to 300° C., preferably between about 135° to 250° C. The resulting endo isomer of the tribasic compound, which may be represented by compound (III) below, is then refluxed with water for about 0.1 to 10 hours, i.e., for a time sufficient to produce the dibasic acid lactone, which may be represented by compound (IV) below, as illustrated by the following equation:

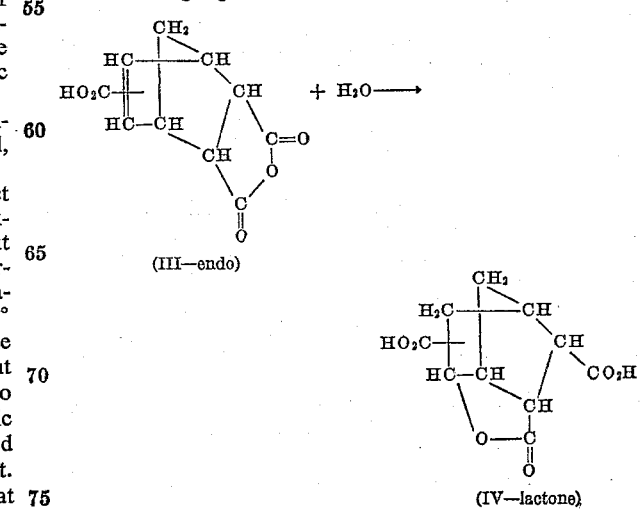

Any exo isomer (if present) as represented by compound (III) below hydrolyzes to a tribasic acid represented by compound (V) below, as follows:

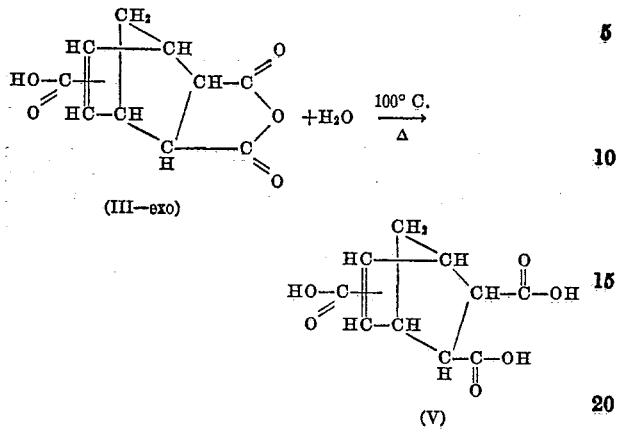

The dibasic acid lactone formed (IV) is then readily separated from tribasic (V) acid by cooling the aqueous solution thereof to a temperature level of about 20° C. or lower, preferably 0° to 10° C. At these temperatures, the dibasic acid lactone IV precipitates out, the tribasic acid (V) remaining in solution. The dibasic acid lactone precipitate is then readily recovered by centrifuging or especially filtration, etc.

The alkyd type resinous compositions of the present invention may be made in any desirable manner. The compositions may be produced by reacting a dibasic acid lactone derived from a preformed tricarboxylic adduct of a dicyclodiene dicarboxylic acid and dienophilic dicarboxylic compound with an admixture of the glycol and unsaturated aliphatic monobasic acid. The resinous composition may also be produced by esterifying a dibasic acid lactone derived from a preformed tricarboxylic adduct of the dicyclodiene dicarboxylic acid and dienophilic dicarboxylic compound with an excess of the glycol followed by substantially complete esterification of the glycol with the unsaturated aliphatic monobasic acid. Esterification temperatures, as beforementioned, are advantageously between about 100° to 300° C.

In order to more fully illustrate the present invention, the following examples are given:

*Example 1.*—A dicyclopentadiene dicarboxylic acid-maleic anhydride adduct was produced by heating and stirring a suspension of 0.5 mole (110 grams) of dicyclopentadiene dicarboxylic acid and 1.0 mole (98 grams) of maleic anhydride in 400 cc. of anhydrous xylene. The charge was heated and maintained at reflux until the cloudy suspension changed into two distinct phases( if stirring is stopped); a clear upper liquid phase and an opaque brown lower phase. The mixture was heated with vigorous stirring for an additional 15 minutes. The layers then separated and the lower viscous phase was dried under 10 millimeters of mercury absolute at a temperature below 100° C. (i.e. 50° C.).

One hundred grams of the above adduct was then boiled for 3 hours (the preferred time range being about 2 to 5 hours) with 300 cc. of water to produce a yellow aqueous solution of the same. The dibasic acid lactone was then recovered by boiling said yellow solution with one gram of charcoal and simultaneously reducing the volume to 200 cc. by boiling. After hot filtration (90–95° C.), the solution was cooled to room temperature and 35 gms. of the white crystalline lactone separated by filtration at room temperature. Three further concentrations of the above filtrate afforded 20 gms. more of the lactone. The dibasic acid lactone derived from the endo isomer of the tricarboxylic adduct of maleic anhydride with dicyclopentadiene dicarboxylic acid was a white crystalline compound having a melting point of 225° C. (with decomposition) and an acid number of 0.881.

The above lactone (37.7 grams) was cooked with 44.6 grams (0.167 equivalent) of linseed oil fatty acids and 27.9 grams (0.734 equivalent) of propylene glycol for 23 hours at a maximum temperature of 215° C. The resin produced had a Gardner viscosity of "0" (3.7 poises) at 50% dilution in a commercially available solvent (solvent "A"). The solvent was derived from a naphthenic base crude and had the following properties:

| Characteristics: | Value |
|---|---|
| Flash point (° F.) | 105 |
| Aromatics (wt. percent) | 95 |
| I. B. point (° F.) | 300 |
| F. B. point (° F.) | 370 |

Evaluations of the above alkyd resin dissolved to 50% N.V.M. in solvent "A" in films baked at 300° F. without an added drier were as shown below:

TABLE

| Film | | | Chemical Resistance [1] | | | |
|---|---|---|---|---|---|---|
| Baking time at at 300° F., minutes | Thickness (mils.) | Sward Hardness | Water | Grease | Soap | Caustic |
| 30 | 0.65 | 10 | 0 | 0 | 0 | 1 |
| 60 | 0.80 | 16 | 0 | 0 | 0 | 1 |
| 30 | 1.05 | 16 | 0 | 0 | 0 | 1 |

[1] Water for 5 hours; grease for 2 hours; soap for 2 hours; and caustic of 1% NaOH for 1 hour.
Code=0—unaffected to 9—complete failure.

The above results obtained with the alkyd resins of the present invention are excellent as compared to conventional Glyptal resins.

While there are above described a number of specific embodiments of the present invention, obviously resort may be had to other embodiments and various equivalent modifications and variations thereof without departing from the spirit of the invention or the scope of the appended claims.

What is claimed is:

1. An alkyd resin prepared by the process which comprises: (a) boiling a mixture of the tricarboxylic adduct of a $C_{12}$ to $C_{14}$ dicyclopentadiene dicarboxylic acid and a $C_3$ to $C_8$ unsaturated aliphatic dicarboxylic anhydride with water for about 0.1 to 10 hours to form a dicarboxylic acid lactone, separating the lactone from the mixture and (b) heating said lactone and 15 to 60 equivalent percent of an unsaturated aliphatic monocarboxylic acid containing about 10–20 carbon atoms, based on the total equivalents of acid, with at least an equivalent amount, based on the total equivalents of acid, of a glycol selected from the group consisting of $C_3$–$C_{16}$ glycols having two adjacent hydroxyl groups, $C_4$–$C_{12}$ glycol ethers and mixtures thereof at a temperature between 50 and 350° C. for a period of about 1 to 40 hours to produce an improved alkyd resin.

2. An alkyd resin prepared by the process which comprises boiling a mixture of the tricarboxylic adduct of dicyclopentadiene dicarboxylic acid and maleic anhydride in water for about 0.1 to 10 hours to form a dicarboxylic acid lactone, separating the lactone from the mixture and heating said lactone and 15 to 60 equivalent percent of an unsaturated aliphatic monocarboxylic acid containing about 10 to 20 carbon atoms, based on the total equivalents of acid, with at least an equivalent amount, based on the total equivalents of acid, of propylene glycol at a temperature between 50 and 350° C. for a period of 1 to 40 hours to produce an improved alkyd resin.

3. The alkyd resin of claim 2 where the unsaturated aliphatic monocarboxylic acid is linseed oil acid.

4. A process for preparing a resinous composition which comprises reacting a $C_{12}$ to $C_{18}$ dicyclopentadiene dicarboxylic acid at a temperature between 125° and 350° C.

with a $C_3$–$C_8$ unsaturated aliphatic dicarboxylic acid anhydride, boiling a mixture of the tricarboxylic adduct formed and water to produce the corresponding dicarboxylic lactone, separating the lactone from the mixture, heating said lactone and 15 to 60 equivalent percent based on total equivalents of acid of a $C_{10}$–$C_{20}$ unsaturated aliphatic monocarboxylic acid and at least an equivalent amount based on total equivalents of acid of a glycol of 3 to 16 carbon atoms selected from the group consisting of glycols containing two adjacent hydroxyl radicals, glycol ethers, and mixtures thereof at a temperature between about 50° to 350° C. for a period sufficient to form an improved alkyd resin.

5. A process for producing an improved alkyd resin which comprises reacting a $C_{12}$ to $C_{14}$ dicyclopentadiene dicarboxylic acid at a temperature between 130° to 250° C. with maleic anhydride, boiling a mixture of a tricarboxylic adduct formed with water for a period sufficient to produce the corresponding dicarboxylic lactone, separating the lactone from the mixture, esterifying said lactone with a $C_3$–$C_{16}$ glycol selected from the group consisting of glycols containing two adjacent hydroxyl radicals, glycol ethers and mixture thereof at a temperature of about 50° to 300° C.; adding to the reaction 25 to 50 equivalent percent based on the total equivalents of acid of a $C_{12}$–$C_{18}$ unsaturated aliphatic monocarboxylic acid said total equivalents of acid being approximately equal to the total equivalents of said glycol, completing the esterification at a temperature between 100° to 350° C. for a period sufficient to form an improved alkyd resin and recovering the improved alkyd resin formed thereby.

6. Composition according to claim 1 in which the glycol is triethylene glycol.

7. Composition according to claim 1 in which the glycol is 2,3-butanediol.

8. Composition according to claim 1 in which the glycol is diethylene glycol.

9. Composition according to claim 1 in which the dicarboxylic acid is dicyclopentadiene dicarboxylic acid.

10. Composition according to claim 1 in which the dicarboxylic acid is a methyl dicyclopentadiene dicarboxylic acid.

11. A varnish which comprises about 25 to 75 parts by weight of the resinous composition of claim 2, and correspondingly about 75 to 25 parts by weight of a substantially saturated hydrocarbon resin solvent, said varnish being substantially free of driers.

12. A varnish which comprises about 25 to 75 parts by weight of the resinous composition of claim 2, correspondingly about 75 to 25 parts by weight of a hydrocarbon resin solvent, and about 0.1 to 0.5 weight percent of a drier selected from the group consisting of cobalt, lead and manganese naphthenates and mixtures thereof.

13. Process according to claim 2 in which the dicyclodiene dicarboxylic acid is dicyclopentadiene dicarboxylic acid, the dicarboxylic anhydride being maleic anhydride, the acid and maleic anhydride being reacted at a temperature level between about 130 and 250° C., the esterification temperature being also at said level.

References Cited in the file of this patent

UNITED STATES PATENTS

| 2,716,662 | Cohen et al. | Aug. 30, 1955 |
| 2,860,112 | Leary et al. | Nov. 11, 1958 |